Patented June 12, 1951

2,556,722

UNITED STATES PATENT OFFICE 2,556,722

REMOVAL OF WATER HAZE FROM IMMISCIBLE LIQUIDS

Arthur B. Hersberger, Drexel Hill, Pa., assignor to The Atlantic Refining Company, Philadelphia, Pa., a corporation of Pennsylvania No Drawing. Application October 25, 1946, Serial No. 705,813

8 Claims. (Cl. 210—204)

The present invention relates to a method of removing water haze from water-immiscible liquids, and particularly from hydrocarbon oils such as gasoline, kerosene, furnace oil, and the like.

It has been proposed heretofore to remove haze or very finely divided water droplets from oils by filtering the oil through a filamentous material such as mineral wool in order to coagulate the haze into drops of such size as to be readily separable from the oil. This procedure has been partially successful in that the first portion of oil coming through the filter was relatively clear, but shortly thereafter no coagulating effect was obtained and the oil came through the filter in a hazy condition. In other words, the yield of clear oil per volume of filamentous material was small and the filters had to be renewed frequently to obtain the desired result.

I have found that this difficulty may be overcome by utilizing a filamentous filter material, the surfaces of which have been treated with an organo-silicon halide, with the resultant formation upon such surfaces of a silicone film which is inert to oil and other organic liquids and which is not wetted by water but is highly effective in coagulating water haze into drops of such size as to be readily separated from the oil or other liquid. Furthermore, the silicone-coated material does not lose its water-coagulating properties even over extended periods of use, with the result that very large volumes of liquid may be treated for haze removal without renewing the filter material.

In accordance with this invention, a filamentous material such as mineral wool or rock wool, glass wool, metal turnings or filings, cellulose fibers, or dust, rayon or nylon wool, or other synthetic or natural fibers, is treated with an organo-silicon halide to form upon the surfaces of such filamentous material a film of silicone.

The organo-silicon halides which may be employed in treating the filamentous material include the alkyl silicon chlorides and the aryl silicon chlorides; and in fact any hydrocarbon-substituted silicon halide which is susceptible of application to the filamentous material to form thereon a thin, insoluble silicol or silicone film. The alkyl silicon chlorides are exemplified by the mono-, di-, and trimethyl silicon chlorides, mono-, di-, and tri-ethyl silicon chlorides, mono-, di-, and tri-propyl silicon chlorides, mono-, di-, and tri-butyl silicon chlorides, and the higher homologues thereof, as well as the various halogenated alkyl silicon chlorides. The aryl silicon chlorides are represented by phenyl silicon chloride, tolyl silicon chloride, xylyl silicon chloride, ethyl phenyl silicon chloride, propyl phenyl silicon chloride, and the high alkylated phenyl silicon chlorides; as well as the halogenated aryl silicon chlorides. Mixed organo-silicon chlorides in which both alkyl and aryl substituents occur may also be used. These are exemplified by di-methyl mono-phenyl silicon monochloride, mono-methyl mono-phenyl silicon dichloride, and di-ethyl mono-phenyl silicon mono-chloride. Although it is preferred to employ chlorine as the halogen constituent in the organo-silicon halides, the other halogens iodine, bromine, and fluorine may be substituted therefor.

The various organo-silicon halides may be prepared by conventional methods such as the Grignard reaction, wherein an alkyl or aryl magnesium halide is reacted in ether solution with a silicon tetrahalide such as silicon tetrachloride. The resulting alkyl or aryl silicon halide is separated from the precipitated magnesium salt, and may be purified by fractional distillation at reduced pressure, or by other means. Since the preparation of these compounds is well known and forms no part of the present invention, further discussion thereof is here unnecessary.

In treating the filamentous material, the surfaces of which preferably contain an adsorbed film of moisture, the organo-silicon halide may be applied in the form of a vapor. This may be accomplished by passing a dry gas, such as air, over or through a quantity of the organo-silicon halide contained in a suitable vessel, and the resulting air saturated with the halide is then contacted with the filamentous material. The reaction between the organo-silicon halide vapor and the surface moisture produces a thin film of a silicol, which upon continued exposure to air at ordinary temperature, further condenses with loss of water to a stable, tenaciously-adhering film of insoluble silicone polymer. The hydrogen halide produced as a by-product during the initial reaction between the organo-silicon halide and the moisture adsorbed upon the surfaces of the filamentous material may be removed by passing a stream of dry air over the treated material. If desired, the air may contain ammonia to effect neutralization of the hydrogen halide. After the above treatment, the treated material is in condition for use in the removal of water haze from liquids. While it is preferred to apply the organo-silicon halide in the form of a vapor, such halide may also be utilized in solution in a volatile, inert solvent. In this case, the filamentous material is contacted with a fine spray, fog, or mist of the organo-silicon halide in the solvent, and the latter is removed by vaporization or air drying. The composition and properties of the films employed in this invention are dependent upon both the composition of the organo-silicon halide initially used, and the nature of the agent initially adsorbed upon the filamentous material. For example, a trialkyl silicon monochloride when reacted with water gives a trialkyl silicol $R_3Si.OH$, the condensation of two molecules of which produces an ether-like compound $R_3Si.O.SiR_3$. The trialkyl silicon monochloride when reacted with a monohydric alcohol in lieu of water gives an ether such as $R_3Si.O.R$, and with a polyhydric alcohol such as glycol, a complex ether $R_3Si.O.CH_2CH_2.O.SiR_3$. On the other hand, a dialkyl silicon dichloride when reacted with water, gives a dialkyl silicol $R_2Si(OH)_2$, the condensation of a plurality of molecules of which produces a linear silicone polymer $R_2Si.O.SiR_2.O.SiR_2.O.SiR_2 \ldots O.SiR_2$. The dialkyl silicon dichloride when reacted with a monohydric or polyhydric alcohol in lieu of water, gives a complex linear polymer in which the $R_2Si-$ groups are linked through $RO-$ or through $-OCH_2CH_2O-$. The reaction of a mono-alkyl silicon trichloride with water, or with mono- or poly-hydric alcohols gives rise to very complex cross-linked silicone polymers, which, like the compounds exemplified above, are suitable for the filming of the surfaces of the filamentous material.

The present invention may be further illustrated by the following examples, which, however, are not to be construed as limiting the scope thereof.

Two filters were prepared by placing in the bottom of each of two glass filter tubes of 16 mm. internal diameter, a small quantity of glass wool. The tubes were then filled to a depth of 50 mm. with rock wool. The first filter was used as the blank. The rock wool in the second filter was coated with silicone by pouring 2 cc. of dimethyl silicon dichloride into the filter and passing air through the filter. In this manner the dichloride was vaporized and spread over the filaments comprising the rock wool, and due to the adsorbed moisture on the rock wool, the dichloride was decomposed to form a silicone coating on the surfaces of the rock wool. The treated wool was freed of hydrogen chloride by continued blowing with air.

To compare the haze-removing efficiencies of the two filters, a furnace oil fraction containing a heavy water haze was passed through the filters at a rate of 90 cc. per minute at a temperature of 100° F. The results observed with successive volumes of filtrate are tabulated below.

| Successive vols. of oil filtered | 1st filter (Untreated rock wool) | 2nd filter (Silicone-filmed rock wool) |
|---|---|---|
| Cc. | | |
| 350 | Clear filtrate, no free $H_2O$ droplets. | Clear filtrate, no free $H_2O$ droplets. |
| 200 | Clear filtrate, few free $H_2O$ droplets. | Clear filtrate, few free $H_2O$ droplets. |
| 300 | Hazy filtrate, free $H_2O$ droplets. | Clear filtrate, many $H_2O$ droplets. |
| 500 | ----do---- | Do. |
| 500 | ----do---- | Do. |

From the above results, it will be seen that the first filter containing untreated rock wool produced only 550 cc. of clear filtrate, whereas the second filter containing the dimethyl silicon dichloride-treated rock wool produced a clear filtrate from the entire quantity of hazy oil charged, namely, 1850 cc. Furthermore, the accumulated coalesced water in the second filter was discharged by the flow of oil as fairly large droplets, which settled immediately leaving the oil clear and bright. On the other hand, the untreated rock wool in the first filter did not visually coalesce the water haze readily, and the accumulated coalesced droplets washed through the filter by the oil flow were considerably smaller than those from the second filter.

In large scale operations it is only necessary to provide a suitable vessel for containing the treated filamentous material, and then pass the liquid containing water haze through the material at a rate and temperature such as to coalesce the haze into separable droplets, and thereafter separating the droplets from the filtered liquid in the bottom of the vessel, or in a conventional settler or separator connected with the discharge outlet of the filter vessel.

While the method of the present invention is adapted for the removal of water haze from immiscible liquids such as refined oil, it may also be applied in the removal of water and salts from crude petroleum, and in the removal of haze or minute water droplets from lubricating oils, fatty oils, and water-immiscible liquids such as higher aliphatic alcohols, esters, ketones, chlorinated hydrocarbons, aromatic hydrocarbons, mineral white oils, liquefied hydrocarbon gases, solvents, and the like.

I claim:

1. The method of removing water haze from liquids substantially immiscible with water, which comprises passing the liquid containing water haze through a filamentous material the surfaces of which are coated with a silicone film, coalescing the water haze into drops, and separating the drops from the immiscible liquid.

2. The method of removing water haze from hydrocarbon oil, which comprises passing said oil containing water haze through a filamentous material the surfaces of which are coated with a silicone film, coalescing the water haze into drops, and separating the drops from the oil.

3. The method of removing water haze from hydrocarbon oil, which comprises passing said oil containing water haze through mineral wool the surfaces of which are coated with a silicone film, coalescing the water haze into drops, and separating the drops from the oil.

4. The method of removing water haze from liquids substantially immiscible with water which comprises passing the liquid containing water haze through a filamentous material, the surfaces of which are coated with a silicone film prepared from an organo-silicon halide, coalescing the water haze into drops, and separating the drops from the immiscible liquid.

5. The method of removing water haze from liquids substantially immiscible with water which comprises passing the liquid containing water haze through a filamentous material, the surfaces of which are coated with a silicone film prepared from an alkyl-silicon halide, coalescing the water haze into drops, and separating the drops from the immiscible liquid.

6. The method of removing water haze from liquids substantially immiscible with water which comprises passing the liquid containing water haze through a filamentous material, the surfaces of which are coated with a silicone film prepared from a dimethyl silicon dichloride, coalescing the water haze into drops, and separating the drops from the immiscible liquid.

7. The method of removing water haze from liquids substantially immiscible with water which comprises passing the liquid containing water haze through a filamentous material, the surfaces of which are coated with a silicone film prepared from a diethyl silicon dichloride, coalescing the water haze into drops, and separating the drops from the immiscible liquid.

8. The method of removing water haze from liquids substantially immiscible with water which comprises passing the liquid containing water haze through a filamentous material, the surfaces of which are coated with a silicone film prepared from a trimethyl silicon chloride, coalescing the water haze into drops, and separating the drops from the immiscible liquid.

ARTHUR B. HERSBERGER.

REFERENCES CITED

The following references are of record in the file of this patent:

UNITED STATES PATENTS

| Number    | Name         | Date          |
|-----------|--------------|---------------|
| 1,394,011 | Hills        | Oct. 18, 1921 |
| 1,547,712 | Zoul         | July 28, 1925 |
| 2,243,296 | Sweetland    | May 27, 1941  |
| 2,306,222 | Patnode      | Dec. 22, 1942 |
| 2,348,167 | Erwin        | May 2, 1944   |
| 2,361,092 | Gilbert et al| Oct. 24, 1944 |
| 2,412,470 | Norton       | Dec. 10, 1946 |

OTHER REFERENCES

Chemical and Engineering News, vol. 23, Page 616, column 2, lines 6 to 9, April 1945.

Paper Trade Journal, May 29, 1947, page 122.